US012288463B2

(12) United States Patent
Montemurro et al.

(10) Patent No.: US 12,288,463 B2
(45) Date of Patent: Apr. 29, 2025

(54) METHOD AND SYSTEM FOR TRAFFIC MANAGEMENT

(71) Applicant: BlackBerry Limited, Waterloo (CA)

(72) Inventors: Michael Peter Montemurro, Toronto (CA); James Randolph Winter Lepp, Ottawa (CA); Claude Jean-Frederic Arzelier, Molieres-sur-Ceze (FR); Gordon Peter Young, Kineton (GB); Adrian Buckley, Tracy, CA (US); Jeffrey Scott Dever, Kanata (CA)

(73) Assignee: BlackBerry Limited, Waterloo (CA)

( * ) Notice: Subject to any disclaimer, the term of this patent is extended or adjusted under 35 U.S.C. 154(b) by 208 days.

(21) Appl. No.: 16/434,565

(22) Filed: Jun. 7, 2019

(65) Prior Publication Data

US 2019/0385448 A1 Dec. 19, 2019

(30) Foreign Application Priority Data

Jun. 14, 2018 (EP) .................................... 18305731

(51) Int. Cl.

*G08G 1/00* (2006.01)
*G08G 1/01* (2006.01)
*G08G 1/015* (2006.01)
*G08G 1/017* (2006.01)
*G08G 1/087* (2006.01)
*G08G 1/09* (2006.01)

(52) U.S. Cl.

CPC ......... *G08G 1/0145* (2013.01); *G08G 1/0133* (2013.01); *G08G 1/015* (2013.01); *G08G 1/017* (2013.01); *G08G 1/087* (2013.01); *G08G 1/091* (2013.01)

(58) Field of Classification Search

CPC .... G08G 1/0145; G08G 1/0133; G08G 1/015; G08G 1/017; G08G 1/087; G08G 1/091; G08G 1/096741; G08G 1/096783; G08G 1/0965; G08G 1/096725; G08G 1/0112

See application file for complete search history.

(56) References Cited

U.S. PATENT DOCUMENTS

| | | | | |
|---|---|---|---|---|
| 9,381,813 | B2 * | 7/2016 | Hampiholi .............. | H04L 51/26 |
| 9,547,986 | B1 | 1/2017 | Curlander et al. | |
| 9,761,136 | B2 * | 9/2017 | Tonguz .................. | G08G 1/161 |
| 9,805,595 | B1 | 10/2017 | Liebinger Portela | |
| 9,869,560 | B2 | 1/2018 | Gordon et al. | |
| 2011/0130894 | A1 | 6/2011 | Kim et al. | |
| 2011/0218835 | A1 * | 9/2011 | Boss ................ | G06Q 10/06316 701/532 |

(Continued)

FOREIGN PATENT DOCUMENTS

WO 2017174601 A1 10/2017

OTHER PUBLICATIONS

Extended European Search Report, EP18305731.4, Issued Jan. 3, 2019.

(Continued)

*Primary Examiner* — James M McPherson
(74) *Attorney, Agent, or Firm* — Moffat & Co

(57) ABSTRACT

A method at a first computing device providing a local traffic service, the method including detecting a vehicle is transitioning to a region of control of a second local traffic service; and providing, to a second traffic management service, priority information for the vehicle.

17 Claims, 9 Drawing Sheets

(56) References Cited

U.S. PATENT DOCUMENTS

| | | | | |
|---|---|---|---|---|
| 2014/0278029 | A1* | 9/2014 | Tonguz | G08G 1/161 701/117 |
| 2017/0132915 | A1* | 5/2017 | Cross | G08G 1/005 |
| 2017/0276492 | A1 | 9/2017 | Ramasamy | |
| 2017/0301233 | A1 | 10/2017 | Witt et al. | |
| 2017/0358025 | A1 | 12/2017 | Varma et al. | |
| 2019/0035267 | A1* | 1/2019 | Balzer | G08G 1/07 |
| 2020/0064140 | A1* | 2/2020 | Tarkiainen | G05D 1/0291 |

OTHER PUBLICATIONS

Communications-based train control, Wikipedia, May 28, 2018, https://en.wikipedia.org/wiki/Communications-based_train_control.

Safety Evaluation of Installing Center Two-Way Left-Turn Lanes on Two-Lane Roads, US Department of Transportation, Publication No. FHWa-HRT-08-042, Mar. 2008.

Route 139, State of New Jersey Department of Transportation, Mar. 6, 2006, https://www.state.nj.us/transportation/commuter/roads/jcviaducts/photos9.shtm.

ARC-IT—The Architecture Reference for Cooperative and Intelligent Transportation, ARC-IT v. 8.1, US Department of Transportation, Apr. 2018.

European Office Action, EP18305731.4, Issued Jul. 29, 2021.

* cited by examiner

METHOD AND SYSTEM FOR TRAFFIC MANAGEMENT

FIELD OF THE DISCLOSURE

The present disclosure relates to traffic management, and in particular relates to prioritization of vehicles for traffic management.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems, including vulnerable road users such as pedestrians or bicyclists.

ITS system deployment is receiving significant focus in many markets around the world, with radio frequency bands being allocated for the communications. In addition to the vehicle to vehicle communications for safety critical and non-critical applications, further enhancements to provide systems or applications are being developed for vehicle to infrastructure and vehicle to portable scenarios.

With vehicles being connected and exchanging information on a network, there are opportunities for managing traffic more efficiently.

BRIEF DESCRIPTION OF THE DRAWINGS

The present disclosure will be better understood with reference to the drawings, in which.

DETAILED DESCRIPTION OF THE DRAWINGS

Figure 1:
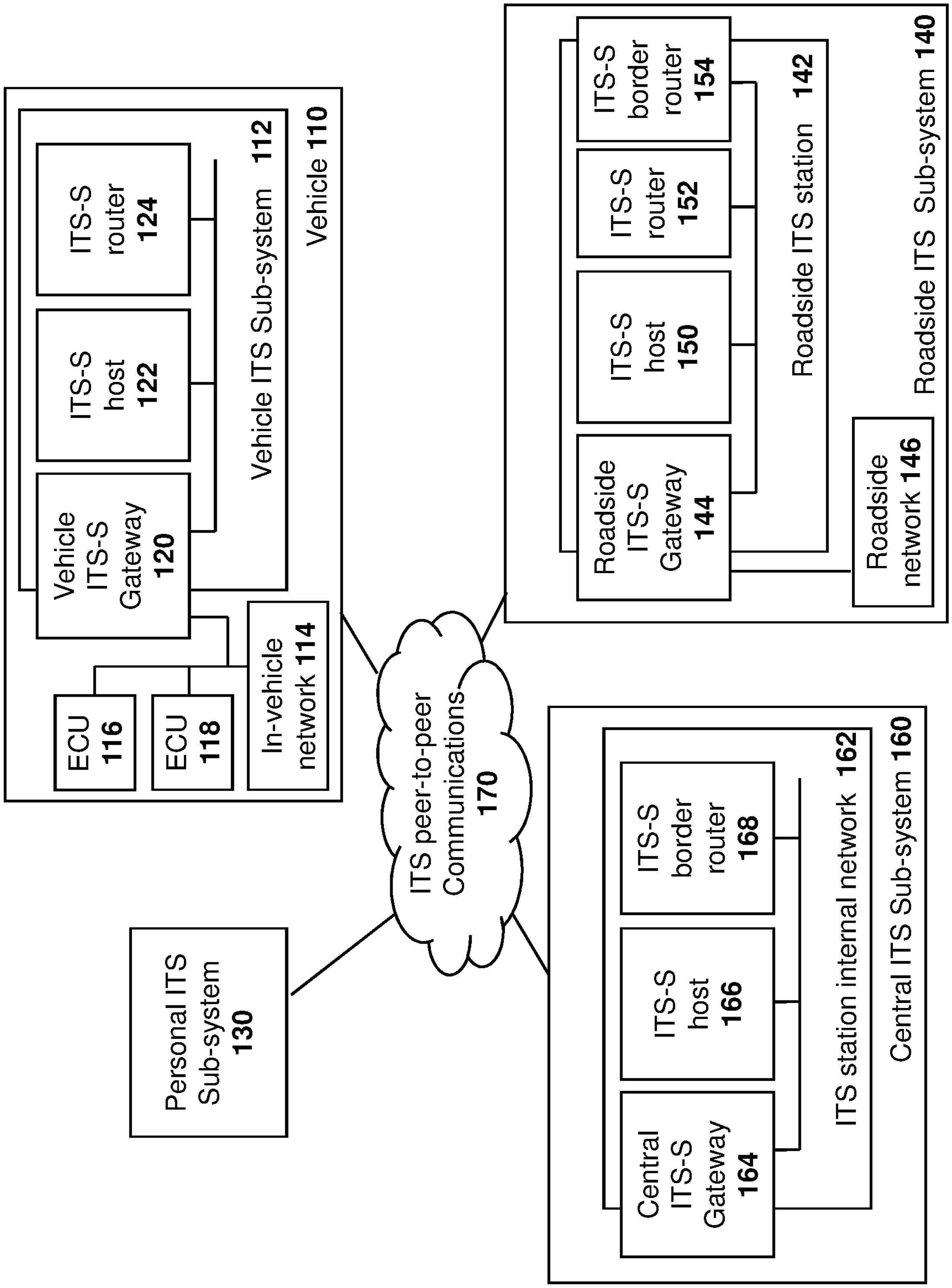
FIG. 1 is a block diagram of an intelligent transportation system.

The present disclosure provides a method at a first computing device providing a local traffic service, the method comprising: detecting a vehicle is transitioning to a region of control of a second local traffic service; and providing, to a second traffic management service, priority information for the vehicle.

The present disclosure further provides a first computing device providing a local traffic service, the first computing device comprising: a processor; and a communications subsystem, wherein the first computing device is configured to: detect a vehicle is transitioning to a region of control of a second local traffic service; and provide, to a second traffic management service, priority information for the vehicle.

The present disclosure further provides a computer readable medium for storing instruction code, which, when executed by a processor of a first computing device providing a local traffic service, cause the first computing device to: detect a vehicle is transitioning to a region of control of a second local traffic service; and provide, to a second traffic management service, priority information for the vehicle.

In the present disclosure, the terms in Table 1 below may be used:

TABLE 1

| Terms | |
|---|---|
| Public User ID or Public User Identity | Could be but not limited to: an MSISDN, email address, SIP URI, Tel URI, vehicle identity<br>The property of this identity is that it is known to the public. |
| Private user ID or Private User Identity | IMSI, SIP URI. Can also be a Temporary ID, vehicle identity<br>The property of this identity is that it is only known to the network and the device., |
| User Identity or User ID | Can be either or both Public User ID and Private user ID. The identity could be wild carded |
| Temporary ID | GUTI, TMSI, P-TMSI, 5G-GUTI or Private user ID than has finite life time and can be assigned to another UE at a different time or in a different location. |

Intelligent Transportation System software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and/or avoidance, and allow a vehicle with such a device to take action to avoid a collision, such as braking and/or steering, or accelerating and/or steering. Such communications may be useful for autonomous vehicles in some cases. In other cases, an active safety system on a vehicle may take input from sensors such as cameras, radar, lidar, and V2X, and may act on them by steering or braking, overriding or augmenting the actions of the human driver. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS Station (ITS-S) gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS system shown in the example of FIG. 1 includes a roadside ITS sub-system 140, which may contain roadside ITS stations and interceptors such as on bridges, traffic lights, among other options.

The roadside sub-system 140 includes a roadside ITS station 142 which includes a roadside ITS-S gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

Central ITS station internal network 162 includes a central ITS-S gateway 164, a central ITS-S host 166 and a ITS-S border router 168. ITS-S gateway 164, central ITS-S host 166 and ITS-S border router 168 have similar functionality to the gateway 144, ITS-S host 150 and ITS-S border router 154 of the roadside ITS station 142.

Communications between the various components may occur through a ITS peer-to-peer communications network 170.

The system of FIG. 1 is however merely one example of an ITS system.

From FIG. 1 above, V2X communications may be used for road safety, for improving efficiency of road transportation, including movement of vehicles, reduced fuel consumption, among other factors, or for other information exchange.

V2X messages that are defined by the European Telecommunications Standards Institute (ETSI) fall into two categories, namely Cooperative Awareness Message (CAM) ($1^{st}$ message set) and Decentralized Environmental Notification Message (DENM) ($2^{nd}$ message set). A CAM message is a periodic, time triggered message which may provide status information to neighboring ITS stations. The broadcast is typically transported over a single hop and the status information may include one or more of a station type, position, speed, and heading, among other options. Optional fields in a CAM message may include one or more of information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such a trigger may be a road hazard or an abnormal traffic condition. A DENM message is broadcast to an assigned relevance area via geo-networking. It may be transported over several wireless hops and event information may include one or more of details about the causing event, detection time, event position, event speed and heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified in addition to or instead of the CAM/DENM messaging.

Priority for Vehicles

Various types of vehicles typically get priority access to infrastructure components. Such vehicles may include, for example, transit vehicles and emergency vehicles. Each of which is described below.

Transit vehicles ($1^{st}$ set of vehicles) are often provided with physical lanes that are allocated for such vehicles. For example, bus lanes or transit lanes may exist in parallel to other roadway infrastructure.

In other cases, infrastructure components such as built-in sensors or signaling lights may provide for priority for public transportation such as buses. For example, buses may receive a special visual or radio signal only for busses to allow the bus to proceed into an intersection prior to other vehicles. In some instances, the behavior of the signals may also be governed by other constraints such as time of day and location of the signal, e.g. rush hour or downtown, inner city or large employment centers, such as tech parks.

Transit vehicles may also have right of way on roadways. For example, various jurisdictions require drivers to give way to merging buses. This requires a driver to identify a bus as different from other types of vehicles and therefore yield to the bus.

ITS stations, including autonomous vehicles ($2^{nd}$ set of vehicles), may in some cases have difficulty in distinguishing buses ($1^{st}$ set of vehicles—which may be autonomous or operator controlled) trying to turn or merge into a lane.

Other systems exist which use knowledge regarding the type of public vehicle behaviors to be enforced. For example, North American vehicles must stop at least 10 feet from and upon meeting, from either direction, a school bus that is stopped for loading and unloading children, which bus typically displays flashing lights and a stop signal arm. This is currently enforced by driver awareness.

With regard to emergency vehicles ($3^{rd}$ set of vehicles), these vehicles typically use a combination of visual and audible outputs to indicate to drivers that they need priority on the roadway. For example, an ambulance may have a visual indication of flashing lights and an audible indication of the siren to indicate that a driver should pull over and make way for the ambulance. Thus, the emergency vehicle indicators provide other drivers with an indication that they need to get out of the way, pull over or stop.

The emergency indicators also provide safety when the emergency vehicle is attending to the emergency, for example when the vehicle is pulled over at the side of the highway. The visual indicators may provide drivers with significant advanced warning that they need to be cautious and perhaps move into a different lane when approaching such emergency vehicles stopped at the side of the road.

Some behaviors when drivers encounter emergency vehicles are governed by laws in a jurisdiction. For example, "move over" laws exist in various jurisdictions in which drivers are required to move over one lane when approaching a stopped emergency vehicle with signals activated at the side of the road.

Further, in some circumstances and jurisdictions there are also guidelines regarding permitted proximity of vehicles following emergency vehicles with flashing lights and sounding a siren. For example, some laws require that drivers remain at least 500 feet behind any moving emergency vehicle Another method for emergency vehicles gaining priority is traffic signal preemption, whereby an emergency vehicle can communicate with a traffic light to change the light in a manner that benefits the emergency vehicle or clears a path or route. Current systems include optical signals such as strobe lights, acoustic and radio signaling. In these cases, typically the signaling is directly between the emergency vehicle and the traffic signal.

With vehicles being connected and exchanging information on a network, there are opportunities for managing traffic more efficiently. Furthermore, with autonomous vehicles, there are opportunities to further optimize vehicle traffic based on other information. Such information may include, but is not limited to, a trip purpose for the autonomous vehicle, a vehicle purpose, route selection, among other such information.

In some cases, there may be instances where certain vehicles may be prioritized over other vehicles on a roadway based on certain conditions.

Today, carpool lanes are used to reduce travel time for vehicles containing more than a minimum number of passengers. Furthermore, emergency vehicles use sirens and lights to signal that they require priority on a roadway over traffic. However, in these cases, although there are laws to guide road users, it is ultimately up to the vehicle operator to ensure that a higher priority vehicle obtains the prioritization.

Figure 2:
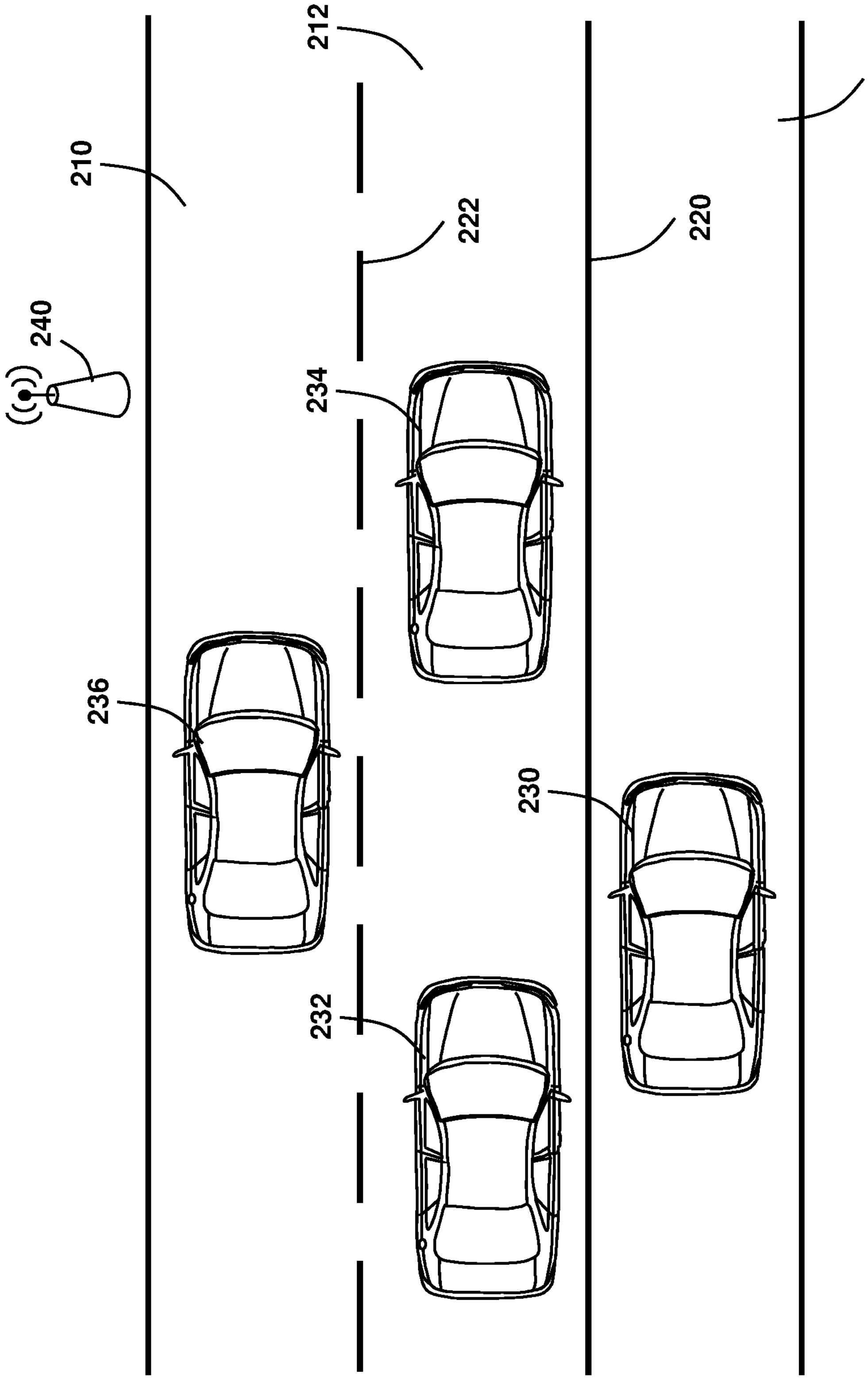
FIG. 2 is a block diagram showing a road environment with prioritized lanes.

Reference is now made to FIG. 2, which shows an example topology of a roadway. The topology of FIG. 2 is however merely provided as an example and in other cases different numbers of lanes, different directions of travel, and other configurations are possible.

In the embodiment of FIG. 2, three lanes are provided, namely lanes 210, 212 and 214.

The lane indicators 220 and 222 are shown to be different in the embodiment of FIG. 2. However, in other cases such indicators may be the same. Further, in some cases, lane indicators may not be provided at all. For example, this may be the case if a roadway is only meant for autonomous vehicles.

In the example of FIG. 2, lane 210 may be given the highest priority. Lane 212 may be given a medium priority and lane 214 may be given the lowest priority. However, in other cases the priorities may be changed, regardless of the physical orientation of the lanes.

Furthermore, in some countries the far left lane may be given the highest priority, for example in a left-hand drive vehicle country. Conversely, in right hand drive countries the right-hand lane might be given the highest priority. Other examples and combinations are possible to reflect local traffic routing and traffic flow needs, including changing lane priorities at different times of day to reflect e.g. direction of traffic flow or traffic lane assignments/authorizations (e.g. non-bus vehicles).

Therefore, in the example of FIG. 2, vehicle 230 may be the lowest priority vehicle. Vehicles 232 and 234 may be medium priority vehicles. Vehicle 236 may be given the highest priority.

Further, in the example of FIG. 2, a roadside unit 240 may provide communications to and from the vehicles on the roadway in order to coordinate the vehicles or to provide control over the roadway.

Today, priority exists in surface transportation systems in physical ways that are not yet extended to V2X communications. This includes priority lanes for buses and public transportation, priority lanes for carpools, priority lanes for electric vehicles, among other examples.

There is a need to communicate the priority over radio communication so that autonomous or semi-autonomous vehicles can yield to each other based on priority. Current systems of drivers seeing bus signals or hearing emergency sirens is unreliable, as drivers do not always notice such indicators and thus do not take appropriate action when required. These visual and audio inputs are difficult to process, and are thus similarly unreliable for autonomous and semi-autonomous vehicles. Additionally, reliance on drivers of non-prioritized vehicles to move over impacts the journey and time taken of the emergency vehicle to reach its destination, causing it to slow down and speed up frequently as it tries to make headway in busy congested traffic situations.

Additionally, some priorities are realized using dedicated lane allocation on a time basis, for which other combinations of traffic may be permitted at other times. For example, public transit lanes may be enforced during busy or commuting times, whereas other traffic may be permitted in such lanes during less busy times. Priority in this case is based on the designated function and associated time restriction.

Time restrictions could also, in some cases, be applied to reflect current real-time traffic conditions and not just be assigned in fixed time periods. This may imply a coordinated monitoring and alerting system to determine priority assignment.

At other times, some lanes may have priority for specific purposes. For example, on motorways, the middle and outside lanes may be used by traffic overtaking slower traffic on the inside lane. On completion of the overtaking procedure, the driver of the vehicle is expected to return to the inside lane. Priority on this basis is based on a behavioral requirement.

The present disclosure therefore provides for various solutions for vehicle prioritization. In one case, a centralized solution is provided. In another case, a vehicle to vehicle solution is provided. Each is described below.

In each of the solutions below, a vehicle may have a prioritization policy. The policy assigns a priority which, in some cases, may be bound by time, location or journey purpose e.g. emergency response. The policy could, in some cases, include an element to indicate that the vehicle could request a higher (or lower) priority for a period of time. The policy could further include other feature priority elements such as the ability to request traffic light changes in the vicinity of a vehicle.

For example, in some cases, features may include the ability to change traffic lights or close barriers. The feature priority may permit an ITS to request such change. Ultimately, an infrastructure element determines whether to grant such request. The determination may include arbitration between competing requests in some cases, where a choice may need to be made by a network element such as a local traffic service or master traffic service on whether to grant the request.

Table 2 below gives an example of a prioritization policy, some or all of the Policy information may be present.

TABLE 2

Priority Policy Definitions

| Policy | |
|---|---|
| Priority | Single to many Priorities. Sub priorities may also be adopted, for example to enable types of vehicles to have the same priority but to provide distinction between them for specific handling in specific scenarios. E.g. during a fire alert to prioritise fire engine access over police car. This could alternatively be achieved when priority is combined with other vehicle information possibly recorded elsewhere, such as vehicle type e.g. fire engine or mission identity e.g. emergency fire response. |
| Ability to request a priority | Yes or No |
| Location | Geographical area priorities are allowed in. Could be defined by GNSS, one or more Routing Area(s), Location Area(s), Tracking Area(s), Cell(s) etc. Could be a defined route e.g. set of way points, with a deviation allowance. |
| Features allowed | e.g. change traffic lights. A further example may allow traffic management to require vehicle speed to increase or decrease. In other cases, vehicle speed may be set to a maximum limit. In other cases, a feature may allow a traffic management service to adjust a route. Other examples are possible. |
| Feature Priority | e.g. ability to change traffic light has a specific level in case multiple requests to change such light are received. |
| Start time | Time priority is allowed |
| Stop time | Time priority stops |

Centralized Solution

In one embodiment of the present disclosure, a system is described in which a traffic management system is provided to manage vehicles dynamically. Each vehicle may be assigned a default priority and could request a change in priority.

A traffic management system service may send operating parameters to a vehicle, which a vehicle will receive and use to adjust its operational parameters such as speed and lane position. The vehicles could be autonomous or semi-autonomous. In a semi-autonomous vehicle, the system may interact directly with the safety system in the car while the driver maintains the control of the car in one example. For example, the safety systems, on receiving the updated operation parameters, may then provide a clear indication or instruction to the driver, indicating where and when changes are required due to prioritization behavior. The operating parameters of the vehicle as operated by the driver may also be reduced, for example a speed reduction, to maintain progress but at a slower speed until prioritization is changed again or until some other event or time period expires. Such operating parameter changes could be done by changing permissions within a priority, or by changing the vehicle priority itself.

A traffic service is configured to control traffic prioritization in a region. There could be a hierarchy of traffic services, where a master traffic service controls priority distribution across multiple local traffic services.

Alternatively, distributed local traffic services could exist that operate over their own region and synchronize their policy, for example amongst neighbors or throughout a set of traffic services in a geographical range. In this case, users or vehicles may be handed over as they come in range and move between adjacent local coverage areas.

The traffic service could be local, such as for a roadway or set of roadways in a constrained area. For example, reference is now made to FIG. 3.

Figure 3:
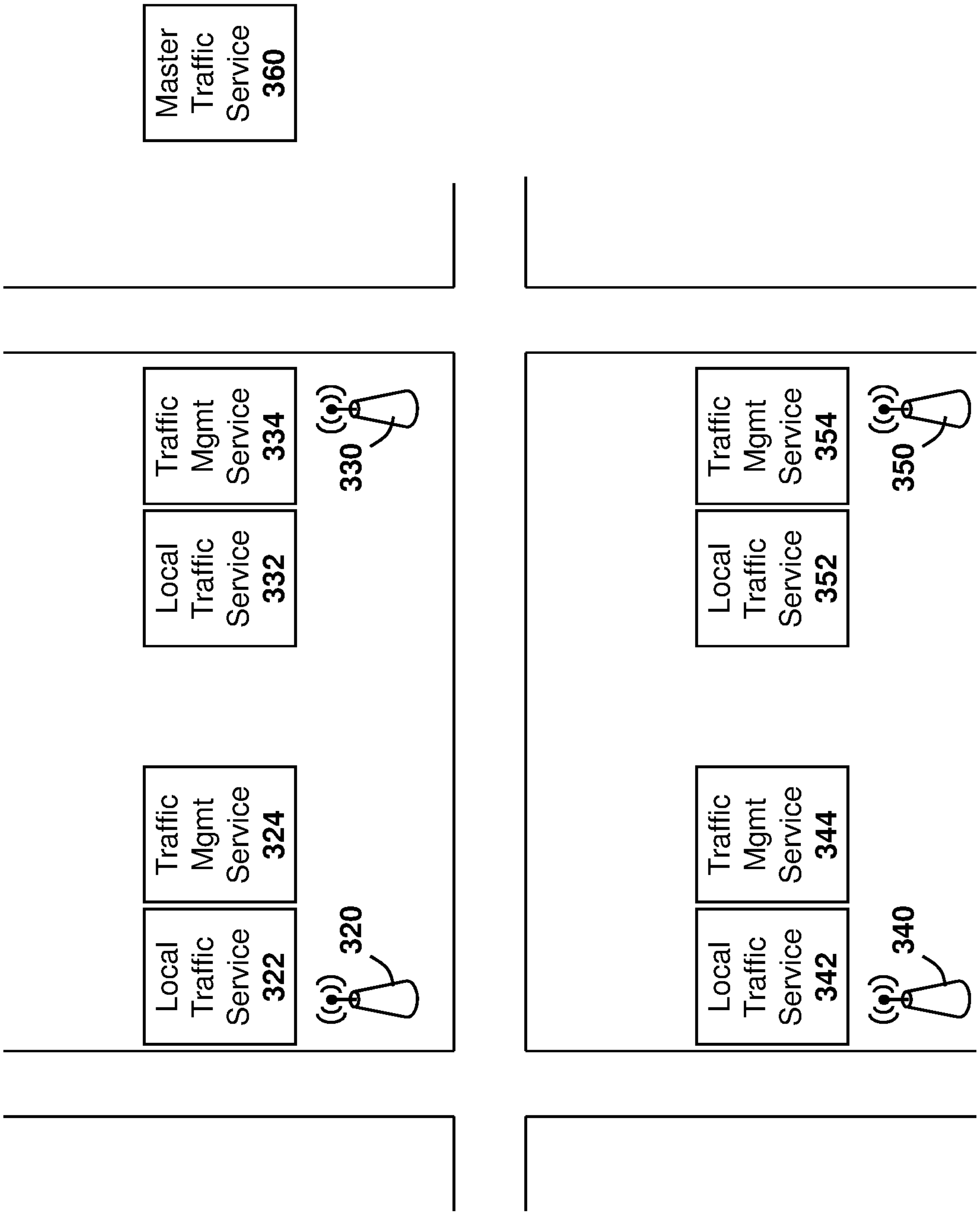
FIG. 3 is a block diagram showing traffic management services controlling various areas or road segments.

In the example of FIG. 3, a traffic service topology is provided in which a plurality of access points 320, 330, 340, 350 is associated with a local traffic service and a traffic management service. In particular, access point 320 may be a roadside unit which controls operation on a road segment. A local traffic service 322 may be a logical component of any network node and may monitor activity on the local roadway and assign priorities. A traffic management service 324 may be a logical component of any network node and may provide control and traffic management on the local roadway. In this example, as well as the examples described below, a logical component may comprise software that is executed by one or more processors of hardware components in the network. A network node may be part of the local Roadside ITS Sub-system 140 or part of the Central ITS Sub-system 160 shown in FIG. 1. The software may be executed in the cloud, in a virtual machine.

Similarly, access point 330, local traffic service 332, and traffic management service 334 may be logical components of any network node and may control a different region or portion of a roadway.

Access point 340 may be associated with a further roadside unit and may have a local traffic service 342 and a traffic management service 344 to monitor a further segment of a roadway.

Access point 350 along with local traffic service 352 and traffic management service 354 may control a different roadway or region.

While the embodiment of FIG. 3 only shows one access point for each road segment or region, it will be appreciated that multiple roadside units or access points could exist for a given region. Further, in some cases communication in a region could be over a cellular network and no roadside unit or access point may exist in a region, or a combination or roadside units and communication over a cellular network may exist.

In some cases, a master traffic service 360 may be a logical component of any network node and may control overall operation of the system for a wider area.

Figure 4:
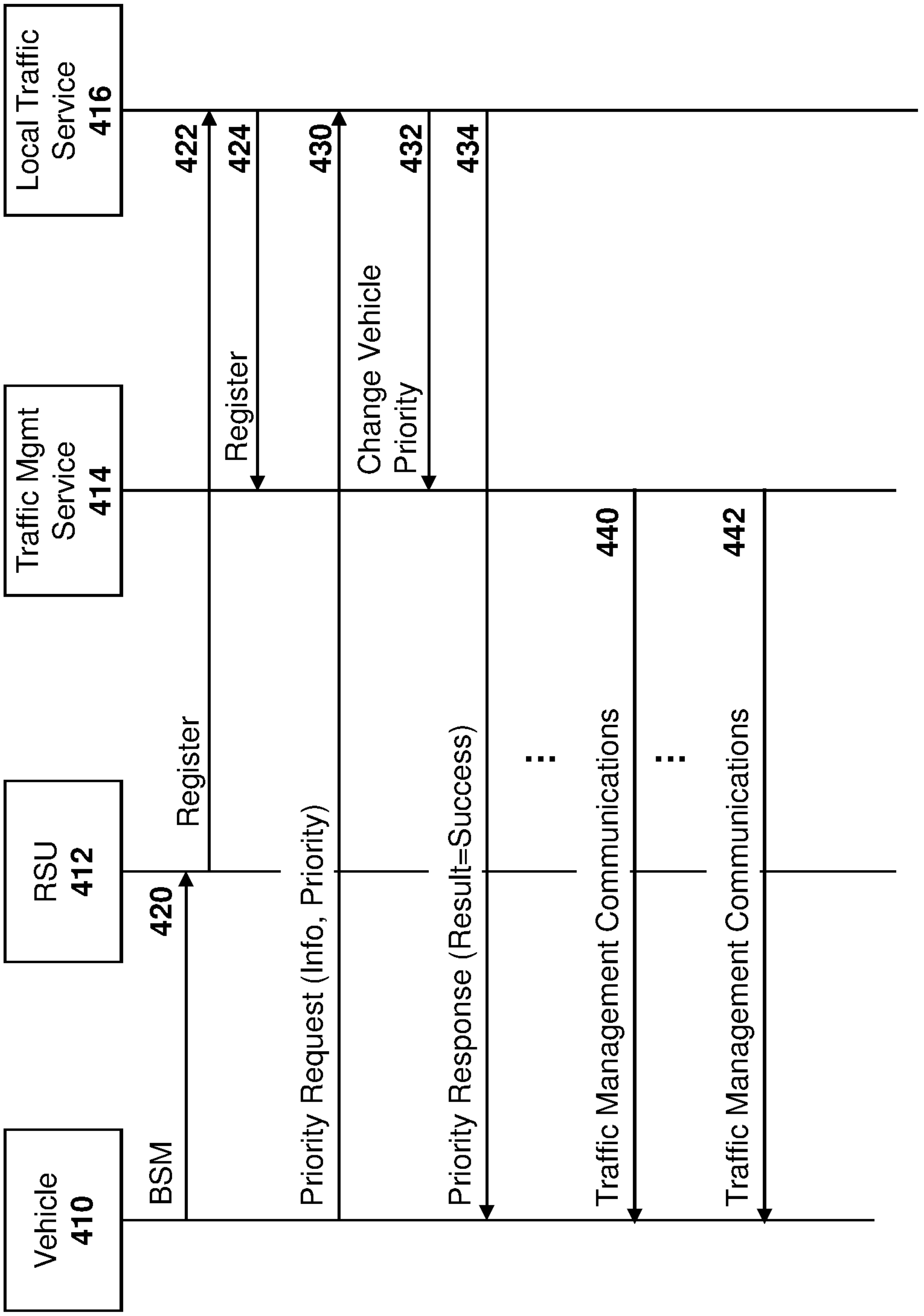
FIG. 4 is a dataflow diagram showing the registration and control of a vehicle in an area of control of a first traffic service.

Reference is now made to FIG. 4, which shows a dataflow diagram for registration and control of a vehicle in an environment such as that of FIG. 3. In the embodiment of FIG. 4, a vehicle 410 registers (e.g. sends a message, which is received by a server e.g. roadside unit) with a local traffic service 416, for example using a roadside unit 412. Registration could include information identifying the vehicle, such as vehicle type, passenger/occupant type, passenger numbers, route information, a current priority in previous region, among other information. However, information exchange could include a subset of such information or could include different information altogether.

The most recent priority in a previous region could be based on various factors, including type of vehicle, time of day, a role of an occupant of the vehicle, an operational status of the vehicle such as whether the vehicle is responding to emergency, type of emergency (fire, traffic accident etc.), a mass transit vehicle performing active public service, among other options. In the case where the role of the occupant is a factor, the association is with an occupant rather than with a vehicle.

With regards to operational status, this may change based on the activity of the vehicle. If the vehicle is an emergency vehicle responding to an emergency call, it may be given a high priority. In some cases, the priority level may be determined by emergency responders. For example, if an ambulance crew is transporting a patient to a hospital with non-life-threatening injuries, this may result in a medium priority level in some cases, while a higher priority may be assigned if the patient's life is in danger.

Conversely, if the emergency vehicle is simply relocating to a new dispatch area or returning home at the end of a shift, then it may be given a low priority. Similarly, a public transit vehicle such as a city bus may be given a higher priority when serving the public, but may be given a lower priority when returning to a depot at the end of the shift.

Various priority factors may be dynamic. This may, for example, include the number of passengers in a vehicle and whether carpooling thresholds are met or not. Other factors may be permanent, such as the type of vehicle.

The registration message and information may, for example, be sent using BSM 420.

In other cases, vehicle information may instead or additionally be obtained by sending only vehicle identity in BSM 420, and the network element then using the identity to look up information that is stored in the network. The vehicle identity could be a Vehicle Identification Number (VIN), license plate number, Department of Motor Vehicles (DMV) registration number, insurance policy number, a temporary identity associated with a vehicle, among other options. The vehicle identity could also be an identifier associated with the driver or vehicle occupant instead of the vehicle, such as insurance policy number, driver's license number, employee identification number, or a temporary identity associated with the occupant.

The registration message is passed to the local traffic service 416, as shown by message 422. Local traffic service 416 may be a logical component of any computing device or network node.

Based on the registration information, the local traffic service 416 may then assign a vehicle a priority. In particular, the traffic service may assign a vehicle a default policy based on the registration information that was provided by the vehicle. Such policy could include some or more of the information from Table 2 above, and could include various default priority levels based on the type of vehicle, whether the vehicle is an emergency vehicle, whether the vehicle is allowed to be prioritized, among other factors.

The local traffic service 416 may then pass the vehicle registration information to a traffic management service 414, that may actively issue control commands to prioritize or de-prioritize traffic based on the request. Traffic management service 414 may be a logical component of any computing device or network node. In particular, traffic management service 414 takes vehicle positions on the road and manages vehicles based on prioritization information received from the traffic prioritization service. Such controls may indicate that a vehicle should change speed (e.g speed up, slow down) which optionally could provide an absolute speed value or increment to change by, change lanes, among other such actions At any point in time, as a vehicle 410 traverses a region controlled by local traffic service 416, the vehicle 410 could request (from local traffic service 416) or be assigned (by a traffic management service 414) a higher or lower priority based on current or updated priority levels or classes. The priority level a vehicle was assigned could change due to the vehicle entering a profile geofencing area, for example. The vehicle may use geolocation measurement, location reporting or other location mechanisms e.g. location area reporting or RSU handover, to determine whether such a priority reassignment should be made. These location mechanisms may include use of other technology or service capabilities such as cellular reporting or local Global Navigation Satellite System (GNSS) to determine the vehicle location.

In other cases, a request 430 to the local traffic service 416 could be made. Examples of situations in which vehicles may request priority changes include, but are not limited to, a function or network element such as the local traffic service 416 receives an indication that an emergency has occurred (e.g. an emergency worker receiving a call to respond to an emergency); a function or network element such as the local traffic service 416 receives an indication that an emergency has been cancelled (e.g. an emergency worker receiving a call that an emergency has been canceled); a carpool vehicle picking up a passenger to meet a High Occupancy Vehicle (HOV) lane requirement; a hybrid vehicle running on $1^{st}$ type of fuel (e.g. the battery) and not using a $2^{nd}$ type of fuel (e.g. gasoline), where $1^{st}$ type of fuels (e.g. electric, natural gas, etc.) vehicles are given priority as an eco-incentive; a vehicle that is prepared to pay a road toll (e.g. driver in a hurry willing to pay a higher road toll); a platoon (i.e. vehicles following closely and mutually communicating with each other) starting; a platoon disbanding; a truck shipping freight; a truck driving empty; and overweight truck; among other factors.

The priority assignment, or priority change may be requested by a vehicle based on conditions it detects via one or many sensors, and/or man machine interface (MMI) (e.g. based on user input), as shown with request 430.

For example, in the carpool case, seat sensors or other sensors to determine multiple occupants on a vehicle, or detecting a MMI input (e.g. manual user input), may trigger a priority change request message.

Alternatively, a priority may be assigned by a network and request 430 may not be needed. For example, in some cases the network may be involved in assigning a platoon, and the network would know when the platoon started or ended. In other cases, the traffic service may have integration with an emergency worker dispatch system. Other examples are possible.

A traffic service may receive request 430 to change priority and process the request. In processing the request, the traffic service may either grant or reject the proposed priority change. In other embodiments, the traffic service may propose an alternate priority in response to the request.

The local traffic service 416 may then pass the updated vehicle priority information to a traffic management service 414 in message 432. The local traffic service 416 may further issue a response 434 to vehicle 410 indicating whether the priority request change was successful.

Traffic management service 414 may then actively issue (sends) control commands in traffic management communications 440, 442, to prioritize or de-prioritize traffic based on the request. In particular, traffic management service 414 takes vehicle positions/location on the road and manages vehicles based on the updated prioritization information received from the traffic prioritization service. Such controls/messages that are sent to and then received by vehicles may indicate that a vehicle should speed up, slow down, change lanes, among other such actions.

In some cases, there may be two, three or more levels of priority. Some of such levels may be related to safety, such as for emergency vehicles, and some levels of priority may be related to efficiency such as for public transportation or carpools, and other levels of priority may simply be monetary such as from multiple rates of tolls.

For monetary prioritization, a driver of a vehicle may be billed at different levels based on a requested priority, or the vehicle may provide a numeric value e.g. a figure that is willing to be paid. The priority may be part of a package or bundle that the driver signs up for and may be connected with a "transponder" associated with the vehicle. In another embodiment a set of credentials (e.g. user name, password, certificate, JSON web token etc.) may be provided to the network, the set of credentials identify the monetary value or priority(s) that may be assigned to the vehicle. The priority may also be on a pay per use basis for a road, bridge, tunnel or other infrastructure.

The tolling radio communication may be combined with the priority radio communication, for example both using DSRC, and may further be combined with other safety and efficiency communications.

Figure 5:
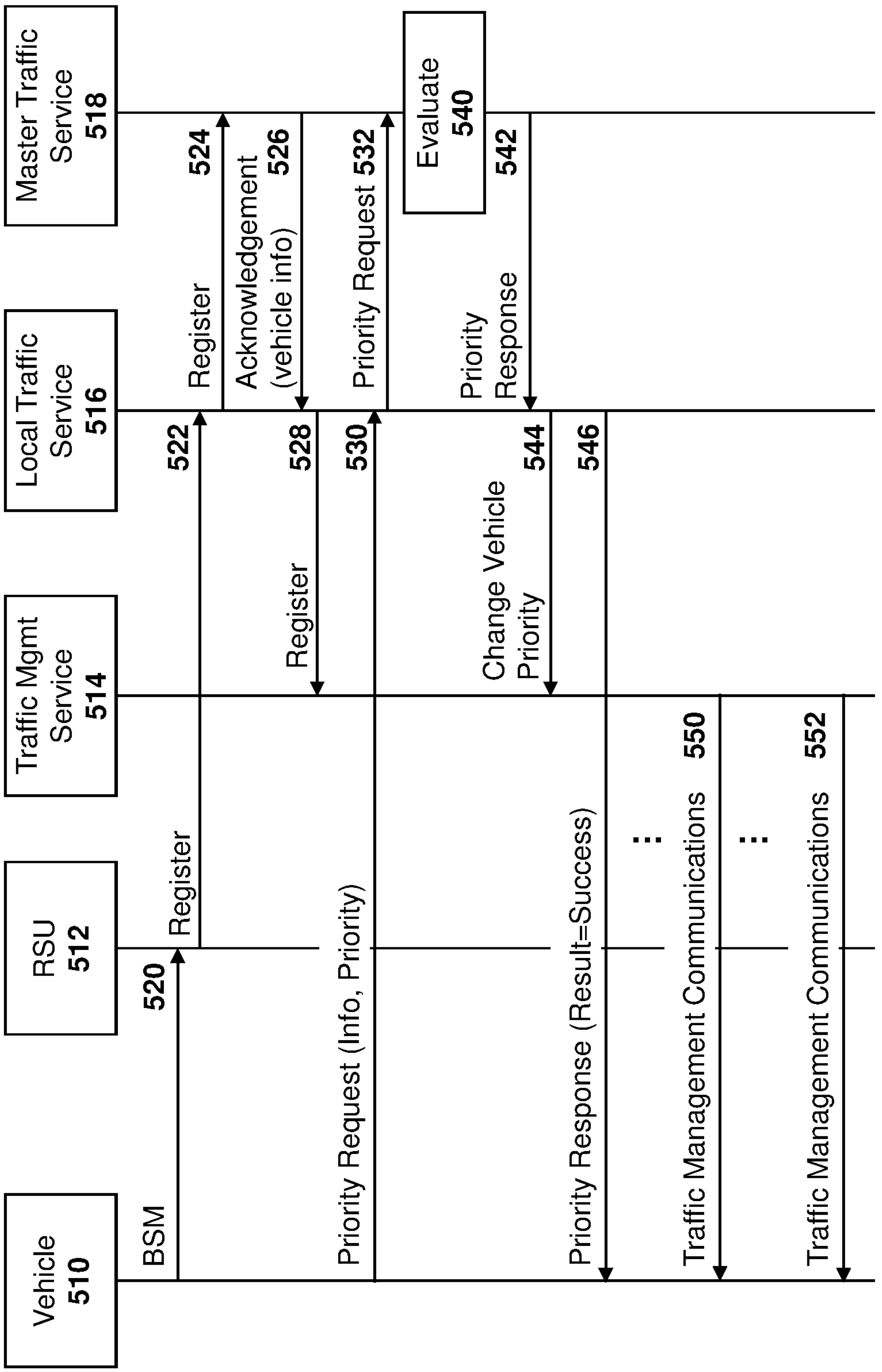
FIG. 5 is a dataflow diagram showing the registration and control of a vehicle in an area of control of a first traffic service using a master traffic service.

In a further embodiment, rather than the local traffic service making the priority decision, the priority decision may be made by a master traffic service. Reference is therefore made to FIG. 5.

In the embodiment of FIG. 5, a vehicle 510 may communicate with an access point such as a roadside unit (RSU) 512 and may send a Basic Safety Message 520 ($3^{rd}$ message set) to the roadside unit 512. The Basic Safety Message 520 may include vehicle identifier information which may be used for registration to a local traffic service.

In particular, RSU 512 sends a registration message with the vehicle identity and other information provided by vehicle 510 which is received by the local traffic service 516, as shown with registration message 522.

In the embodiment of FIG. 5, the local traffic service 516 may then send a registration message 524 which is then received by a master traffic service 518.

The master traffic service 518 may receive message 524 and search registered vehicles to associate the message 524 with the vehicle based on the vehicle identity. The master traffic service may then send a response 526 back to local traffic service 516. Response 526 may include an acknowledgement, along with vehicle information that master traffic service 518 found.

The local traffic service 516 may then register the vehicle, as shown with message 528, with the traffic management service 514. In this case, traffic management service 514 may provide controls (e.g. control information) for vehicle 510, which may include any or all of the following: instructing the change speed (e.g. vehicle to speed up, slow down, start, stop etc.), change position on the road (e.g. change lanes), new priority, among other actions.

At a subsequent time, vehicle 510 may wish it to change its priority level, either up or down. In this case, vehicle 510 may send a priority request message 530 to the local traffic service 516. As indicated above with regard to FIG. 4, in some cases a priority request may not be necessary if the local traffic service 516 can automatically determine whether the vehicle 510 is to change priority.

Based on the receipt of the message 530, or via a determination made locally at the local traffic service 516, the local traffic service 516 may send a priority request 532 to the master traffic service 518.

In the embodiment of FIG. 5, the master traffic service 518 may then evaluate the request received at message 532, shown at block 540, and return a priority response 542 to the local traffic service 516. The priority response may indicate whether the priority may be changed for the vehicle.

The local traffic service 516 may receive message 542 and may then change the vehicle priority with message 544 at the traffic management service 514. The local traffic service 516 may further provide a priority response 546 back to vehicle 510 indicating whether the priority request successfully resulted in a priority change or not.

Subsequently, the traffic management service 514 may control a vehicle 510 through traffic management communications 550, 552 based on the new priority level.

Based on the embodiments of FIGS. 4 and 5 above, the traffic management service may send commands to vehicles to optimize traffic. In this regard, the traffic management service may monitor traffic and issue commands to individual vehicles to update the operating parameters of the vehicles to ensure priority requirements are met.

In some embodiments, the message used for registering the vehicle, and in particular messages 420 and 520 from the embodiments of FIGS. 4 and 5, may use an OAuth token structure for sending the policy.

For example, the token (policy) may have the following claims as provided in Table 3 below:

TABLE 3

| Token Claims | |
|---|---|
| Claim | Content |
| Policy 1 | $1^{st}$ Service<br>$1^{st}$ Credentials set<br>See Table 2 |
| Policy 2 | $2^{nd}$ Service<br>$2^{nd}$ Credentials set<br>See Table 2 |

In Table 3, there is a Service e.g. $1^{st}$ service that is the V2X service (e.g. emergency service, emergency vehicle, fire engine, police car, ambulance, transit vehicle, bus, lorry, motor bike, car pool user, toll user etc.). There are a set (zero to many) of credentials e.g. username and password, certificate etc. which represent credentials that are used so that an entity that authorizes services can use these credentials to determine what services are allowed. One will appreciate that zero to many of the items (service, credentials set, Table 2 information) may be present for the policy.

Further, the policy can be used for information flow, for example as shown in bold in Table 4 below, which is an example change to a standards specification. The UE is the vehicle in the example.

From Table 4 above, the user identity may be constructed in various ways. For example, a first credential screen may be presented to a user and ask for a username. A second credential screen may be presented asking for a situation ID. A user ID that is created could be in the form of a Network Access Identifier (NAI).

Once the UE has the access token as defined in step 3f of Table 4, and if a policy token has not yet been received from the IdM, the UE can then access a configuration management server such as Master Traffic Service 518. The UE will send the configuration management server the access token, and upon receipt of the access token, the access token will identify the policy that should be configured on the UE.

The above can be used with HTTP Get and an appropriate response.

Handoff Between Traffic Services

In one embodiment, the local traffic services may control a road segment or region. A handover may occur when a vehicle (e.g. UE) transitions between a first region or road segment managed by a first traffic service to another ($2^{nd}$) region or road segment managed by a second traffic service. In particular, the handover may allow for the maintaining of priority between the various regions. Further, if route planning is known then the transition may allow for either the continuity in the route planning or the rerouting of traffic based on priority during the transition period.

Figure 6:
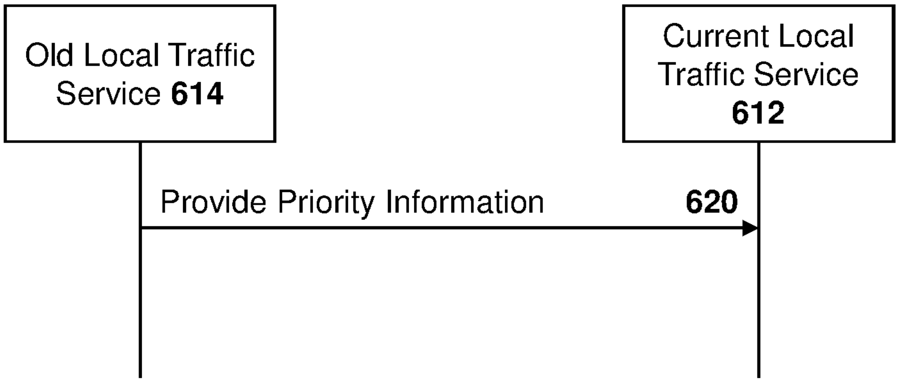
FIG. 6 is dataflow diagram showing the transferring of vehicle priority information from a first local traffic service to a second local traffic service.

Referring to FIG. 6, when one a vehicle approaches a new local traffic service 612 from a current traffic service 614, the vehicle information may be forwarded to the new local traffic service 612 from local traffic service 614. This may occur at the time of the vehicle passes between the traffic services or sometime ahead of the transition between the service areas. For example, if a vehicle is on a roadway and in range of a final RSU for a traffic service and on a trajectory to move to a new traffic service, the transition may be initiated prior to coming into range of an RSU for a new traffic service.

A timestamp maybe included in the message sent from the vehicle to current traffic service 614, or the current traffic service 614 may append a timestamp when it communicates with the new local traffic service 612.

The priority and vehicle information may be provided in message 620. This enables new local traffic service 612 to coordinate instructions and operational information. In this case, when the approaching vehicle needs to switch to the local traffic service 612, an immediate change in the vehicle operation information can be avoided. Such prior information will allow local traffic service to perform pre-planning and allocation of resources before a vehicle arrives.

The timing of the exchange of information between the traffic services may be variable, depending on various factors including local area congestion or level of activity in a particular traffic service area, among other factors. The exchange of information may also take into account the current speed, priority, or other parameters related to the vehicle. This allows for a gradual transition in vehicle behavior or operational information that may be imposed from a current local service based on anticipated neighborhood local service status.

Figure 7:
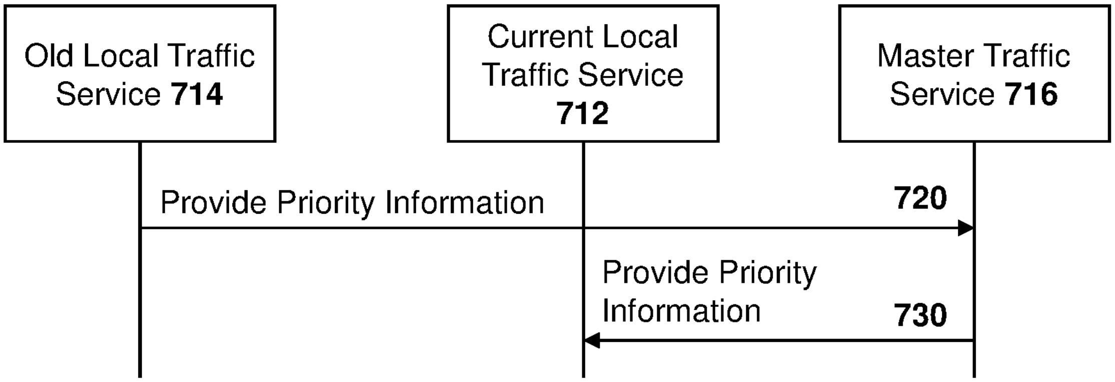
FIG. 7 is a dataflow diagram showing the transferring of vehicle priority information from a first local traffic service to a second local traffic service using a master traffic service.

In a further embodiment, a master traffic service may be involved in the handover between a first local traffic service and a second local traffic service. In particular, reference is now made to FIG. 7. In the embodiment of FIG. 7, a vehicle may be associated with a local traffic service 714 and may be close to a boundary or transition area with a local traffic service 712. In this regard, local traffic service 714 may detect the approach of the vehicle to the boundary and provide priority information to master traffic service 716, shown by message 720.

Master traffic service 716 may then provide the priority information to the local traffic service 712, as shown by message 730.

In this way, the local traffic service 712 may be prepared for the vehicle and may preassign a priority for such a vehicle to allow for consistency between the regions.

In both the embodiments of FIGS. 6 and 7 above, the local traffic service may also inform the traffic management service that the vehicle has left the region of control.

Figure 8:
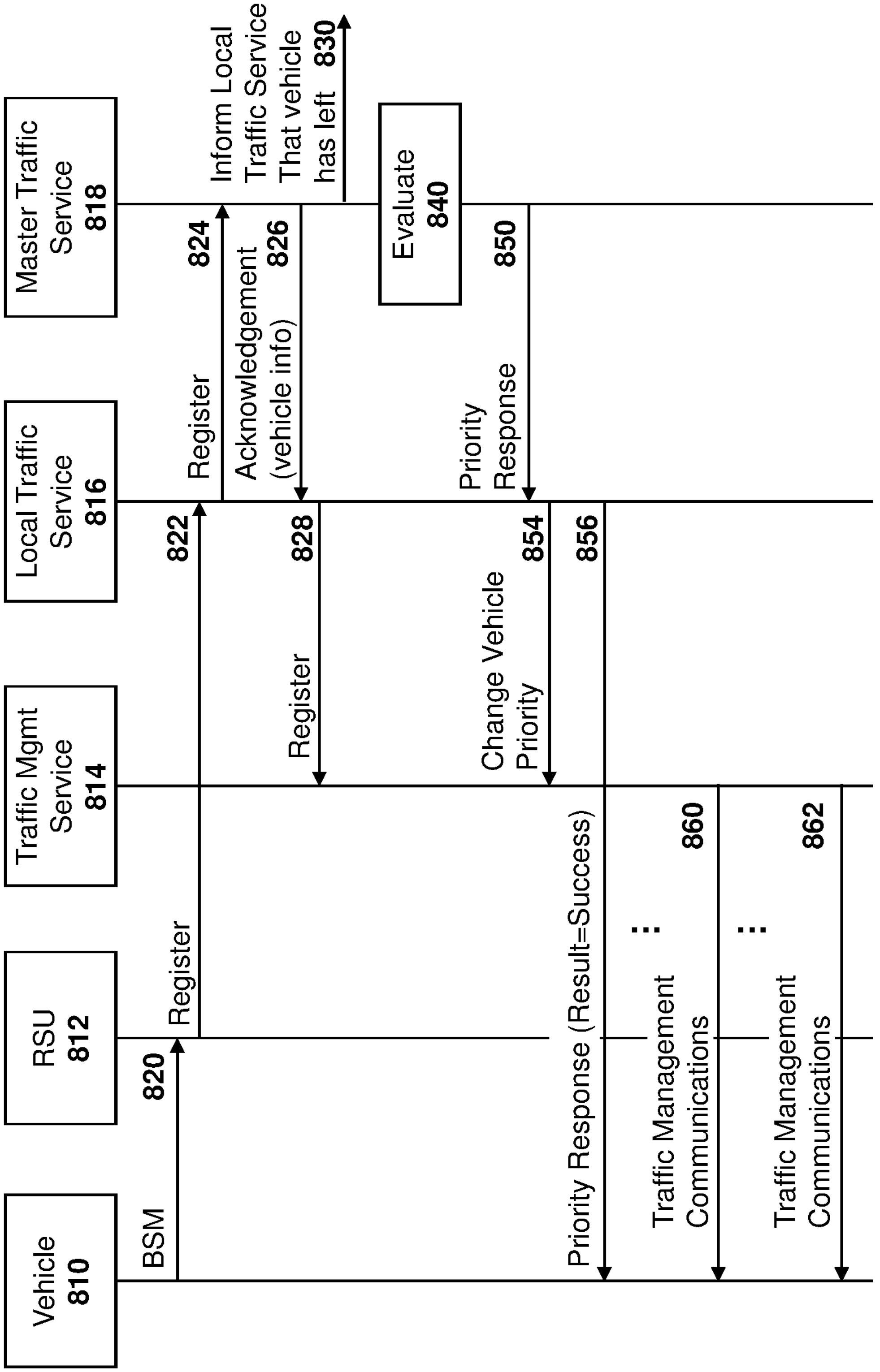
FIG. 8 is a dataflow diagram showing the transferring of vehicle priority information from a first local traffic service to a second local traffic service using a master traffic service upon registration.

In a further embodiment, the transition may occur upon the vehicle registering in a new local traffic service. Reference is now made to FIG. 8. In the embodiment of FIG. 8, a vehicle 810 moves into a new local traffic service area controlled by local traffic service 816. In this regard, vehicle 810 may perform a registration such as that described above with regard to FIG. 4. Specifically, vehicle 810 sends a registration message such as a Basic Safety Message 820 to the RSU 812. RSU 812 may then provide a registration message 822 to the local traffic service 816.

In the embodiment of FIG. 8, the registration message is then forwarded to the master traffic service 818 as registration message 824.

Master traffic service 818 may then look up the vehicle and provide an acknowledgement including vehicle information in message 826 back to the local traffic service 816.

A local traffic service 816 may then provide for registration of the vehicle with registration message 828 to the traffic management service 814. Traffic management service 814 may then control the vehicles, including commanding them to speed up, slow down, change lanes, among other options, when the vehicle is under the control of local traffic service 816.

In addition to providing an acknowledgement message 826, the master traffic service 818 may send a message to the previously serving local traffic service to inform the local traffic service that the vehicle has left its area of control. This is shown with message 830 in the embodiment of FIG. 8. The previous local traffic management service may be known at the master traffic service 818.

The master traffic service 818 may then evaluate the vehicle and its current priority, shown at block 840, in order to determine whether the vehicle has entered with a default priority or an elevated or lowered priority level. If the current priority level of the vehicle is not appropriate, then the master traffic service 818 may send a priority response message 852 to local traffic service 816 to change the priority level at the local traffic service 816.

In response to receiving message 850, the local traffic service 816 may send a change priority message 854 back to the traffic management service 814.

The local traffic service 816 may to also send a priority response message 856 back to vehicle 810 indicating that the vehicle has a different priority than the default priority when entering the new area, region, or road segment.

Subsequently, the traffic management service 814 may send traffic management communications 860 and 862 to vehicle 810 to control the vehicle's behavior with regard to priority.

Thus, based on the embodiments of FIGS. 6 to 8, a trigger condition is realized at a network element. The trigger condition can be the approach of the vehicle to a new road segment, region, or area of control of a traffic service. It can further be the vehicle itself registering with a local traffic service in a new region, road segment or area of control.

Once the trigger condition is met, information about the vehicle can be provided to the new local traffic service to allow integration of the vehicle into the region, road segment or area of control. Such information may include existing priorities in the old area of control, route information, vehicle information, vehicle occupancy, a role of occupants of the vehicle, and/or whether the vehicle is using batteries or gasoline, among other information.

The new local traffic service can then use the received information to integrate the vehicle into the area of control. This could involve assigning a lane or a speed to the vehicle, adjusting the lane or speed of other vehicles, forming a platoon with the vehicle, among other options.

Peer to Peer

In a further embodiment, rather than using a centralized control, vehicles may behave autonomously and assert their priority as a driving parameter. Vehicles may send messages, such as enhanced BSM messages, that indicate their own priority. Generally, such messages would be ciphered and integrity checked so that such messages may be trusted.

Vehicles in range that receive the messages respond by modifying their operational parameters to accommodate other vehicles.

As with a centralized solution, vehicles may be provisioned with a policy that permits the changing of their traffic priority, depending on the characteristics of the vehicle. For example, an emergency vehicle such as an ambulance may be enabled to allow for high priority, whereas a regular vehicle may not be.

Such a system may be highly regulated and at the time of manufacture vehicles may be provisioned with certain priority modes that they are allowed to use.

Further, the change of priority can be combined with other vehicle systems in some cases. For example, the turning on the lights and sirens of an emergency vehicle could trigger automated changes in the vehicle priority.

Further, vehicles may use BSMs or similar vehicle to vehicle messages to assert their priorities.

At any time, a vehicle could assert a priority change. For example, if an ambulance needs to respond to emergency, it may assert a higher priority. In other cases, if seat detectors find that the number of passengers in the vehicle enables a carpool priority then such priority may be asserted.

Further, in some cases, priority may be asserted based on a driver or passenger within the vehicle. Thus, the addition of passengers with a means of asserting a priority change in a vehicle may allow for a priority change. For example, a police officer may assert a higher priority when commandeering a vehicle for the purpose of a pursuit. In this case, an association with an electronic device carried by the police officer may allow for the priority to be any increased. This may be an electronic security badge in close proximity to a sensor on the vehicle. It may further be based on using near field communications (NFC). In other cases, the higher priority may be asserted manually, for example through a manual override of the current priority using a user interface such as a key code or password on a user interface in the vehicle.

A vehicle may then change its priority back to normal when the high priority is no longer needed. This function may be automated and may be based, for example, on time or based on a manual control or other sensor readings such as the electronic device (e.g. the electronic security badge) no longer being detected by the vehicle.

Figure 9:
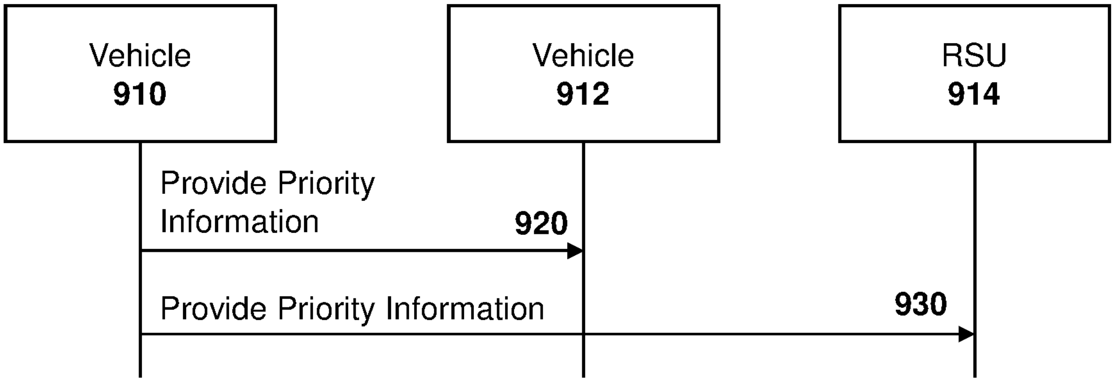
FIG. 9 is a dataflow diagram showing vehicle to vehicle communication for providing priority information.

Thus, referring to FIG. 9, a vehicle 910 may have a priority definition provisioned which allows for a higher priority to be asserted. In this case, other vehicles on the roadway may receive an enhanced V2X message 920, such as a BSM, ETSI ITS messages, etc. Message 920 may provide priority and other information, and may be received by vehicle 912.

Other vehicles operating on the roadway that receive the BSM message may adjust their operational parameters according to the priority asserted by other vehicles. For example, vehicles on a roadway may move over to the slow lane and slow down when they receive a BSM from an ambulance operating at high priority.

Specific behaviors of vehicles having the same priority may also be enforced depending on information provided by the other vehicle. For example, a police car may give way to an ambulance identified to be carrying an emergency patient.

BSM messages may also contain information to change traffic lights. A message 930 may identify an entity that is affected by a priority assertion, such as a traffic light, railway crossing, barrier, among other such entities. In FIG. 9, any of these entities is identified as RSU 914. Further, message 930 may identify a desired effect (indications) for that entity, such as turning a traffic light green, opening a barrier, closing a cross street barrier, among other options.

Further, message 930 may contain a priority level for the vehicle. In this case, an entity such as RSU 914 may receive the BSM, verify the BSM and act on it accordingly.

In some cases, the vehicle may provide a message regarding priority information received from other vehicles to a central infrastructure component such as a local or master traffic service.

When compared with the centralized solution, the vehicle to vehicle solution has lower message overhead and less wireless medium contention. However, without central control, a sub-optimal traffic pattern may result.

Further, the vehicle to vehicle solution may have a lower latency as there is no intermediary for the indication to travel through.

In one embodiment, a report could optionally be sent to a V2X application server or V2X control function as to when or where the priority was asserted. V2X application server, running on the RSU 914, also known as Local Traffic Service 322.

Configuration and Security Considerations

For both the centralized and vehicle to vehicle solutions, a vehicle or service receiving a message described above needs to verify that the message is sent from a trusted source that is authorized to send the message, and that the identified information is correct.

Vehicles are currently provisioned with certificates to ensure messages transmitted and received are authorized and from a trusted source.

In accordance with one embodiment, as part of the provisioned certificate list, the certificate list may be further enhanced with priorities. In this case, the above embodiments allow for a vehicle to be provisioned with authorization information on a default priority and other priorities that they may assert.

In one case, certificate attribute value pairs can be used to provision the prioritization information with that the certificate. For example, a certificate for an emergency vehicle could include various attribute pairs in accordance with the following:

defaultPriority=normal (default is normal)

requestHighPriority=yes (default would be no)

In another example, a farm tractor certificate may be provisioned with the following priorities:

defaultPriority=low requestHigh Priority=no

If a Subscriber Identity Module (SIM), Universal Integrated Circuit Card (UICC) or other similar identifier, collectively referred to as a Universal Mobile Telecommunications Service (UMTS) Subscriber Identity Model (USIM) module, is used for provisioning, priority authorization could also be provided as a special field in the USIM. A network may send this information to the device in a downlink message over the radio interface. For example, the message may be sent via cellular radio interface such as Third Generation Partnership Project (3GPP) Global System for Mobile communications (GSM) EDGE Radio Access Network (GERAN), Universal Terrestrial Radio Access (UTRA), Evolved UTRA (EUTRA), Fifth Generation New Radio (5G-NR) interfaces, among other interfaces. In this case, the message may be a system information message.

The messaging could be achieved at an Access Stratum level by point to point signaling or point to multipoint broadcast signaling. For example, such signaling may be specified in: 3GPP TS 44.018, *"Mobile radio interface layer* 3 *specification; GSM/EDGE Radio Resource Control* (*RRC*) *protocol*", for example in v. 15.1.0, January 2018, for GERAN; 3GPP TS 25.331 "Radio Resource Control (RRC); Protocol specification", for example in v. 15.2.0, April 2018 for UTRAN; 3GPP TS 36.331, *"Evolved Universal Terrestrial Radio Access* (*E-UTRA*); *Radio Resource Control* (*RRC*); *Protocol specification*", for example in v. 15.1.0, April 2018, for Long Term Evolution (LTE); or 3GPP TS 38.331, *"NR; Radio Resource Control* (*RRC*); *Protocol specification*", for example in v. 15.1.0, April 2018, for 5G.

The messaging could also be achieved using non-access stratum messaging. For example, such non-access stratum messaging could be specified in: 3GPP TS 24.008, *"Mobile radio interface Layer* 3 *specification; Core network protocols; Stage* 3", for example in v. 15.2.0, March 2018, for GSM/UMTS; 3GPP TS 24.301 *"Non-Access-Stratum* (*NAS*) *protocol for Evolved Packet System* (*EPS*); *Stage* 3", for example in v. 15.2.0, March 2018, for LTE/Enhanced Packet Core (EPC); 3GPP TS 24.501 *"Non-Access-Stratum* (*NAS*) *protocol for* 5*G System* (5*GS*); *Stage* 3", for example in v. 1.1.1, May 2018, for 5G; among others.

The messaging could also be achieved via Open Mobile Alliance (OMA) Device Management (DM), as specified in the OMA-ERELD-DM-V1_2-20070209=A, *"Enabler Release Definition for OMA Device Management, Version* 1.2".

The messaging could also be provided to the device via JavaScript Object Notation (JSON) as described in the Internet Engineering Task Force (IETF) Request for Consultation (RFC) 7519, *"JSON Web Token* (*JWT*)", May 2015.

Messaging could also be provided to the device via eXtensible Markup Language (XML) as defined in IETF RFC 4825, *"The Extensible Markup Language* (*XML*) *Configuration Access Protocol* (*XCAP*)".

Once provided to the device, the device could store the information in the device memory, or could store the information in the USIM. For example, information may be sent from the device to the SIM.

Information could also be provided to the USIM, rather than the device, via a SIM toolkit or by using a provisioning application. A data structure for such provisioning is specified, for example, in 3GPP TS 31.102, *"Characteristics of the Universal Subscriber Identity Module* (*USIM*) *application*", for example in v. 15.0.0, April 2018.

If such information is stored in the device after reception in the USIM, the USIM could in turn send this information to the device.

Therefore, based on the embodiments described above, a system of V2X radio communication conveying priority in the surface transportation system allows for more reliable yielding by autonomous and semi-autonomous vehicles to higher priority users of the system, such as public transportation vehicles or emergency responders. Road operators can use infrastructure to manage congestion. Further, in some cases, road priority can be tied to monetary payment to enable new business models such as replacing gas taxes for funding road infrastructure.

Both peer-to-peer and infrastructure embodiments are provided above. Each can be used independently or concurrently. For example, in some cases a computing device on a vehicle may receive concurrent instructions from both Peer-to-Peer signaling and from an infrastructure component related to actions based on priority. In this case, the computing device on the vehicle may treat each signal as a sensor service, and combine such signaling with other sensor services. In this way, the computing device on the vehicle may act as an arbitrator to decide which commands to act on, for example if the commands are conflicting.

In the case of the computing device acting as an arbitrator, the computing device may inform the peer-to-peer and infrastructure components of the arbitration and possibly the decision of the arbitration. The peer-to-peer and/or infrastructure component on receiving the arbitration indication from the computing device may make additional decisions and signaling based on the arbitration indication. This may include the need to communicate to other ITS computing devices or the local traffic service or the traffic management service.

The computing device associated with any network element such as a local traffic service, master traffic service, or traffic management service, as well as a computing device on a vehicle or roadside unit, may be any computing device. One simplified diagram of a computing device is shown with regard to FIG. 10.

Figure 10:
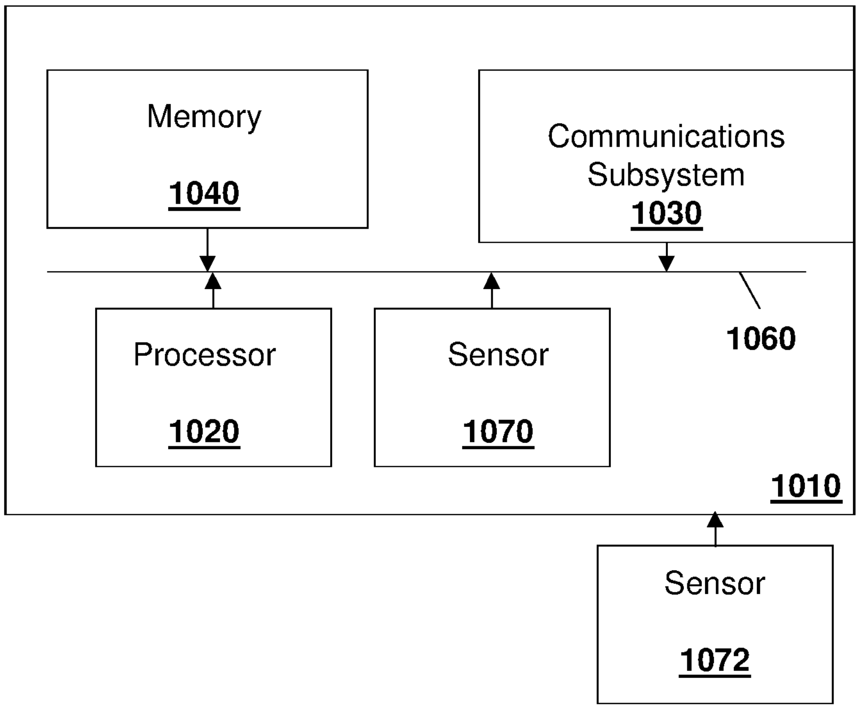
FIG. 10 is a block diagram of a simplified computing device capable of being used with the present embodiments.

In FIG. 10, computing device 1010 includes a processor 1020 and a communications subsystem 1030, where the processor 1020 and communications subsystem 1030 cooperate to perform the methods of the embodiments described above.

Communications subsystem 1030 allows computing device 1010 to communicate with other devices or network elements. Communications subsystem 1030 may use one or more of a variety of communications types, including but not limited to cellular, satellite, Bluetooth™ Bluetooth™ Low Energy, Wi-Fi™ or any IEEE 802.11 communication standard, wireless local area network (WLAN), near field communications (NFC), IEEE 802.15, wired connections such as Ethernet or fiber, DSRC, among other options.

As such, a communications subsystem 1030 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 1030 will be dependent upon the communication network or communication technology on which the computing device is intended to operate.

Communications subsystem 1030 may, in some embodiments, comprise multiple subsystems, for example for different radio technologies.

Processor 1020 is configured to execute programmable logic, which may be stored, along with data, on device 1310, and shown in the example of FIG. 10 as memory 1040. Memory 1040 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1040, device 1010 may access data or programmable logic from an external storage medium, for example through communications subsystem 1030.

Communications between the various elements of device 1010 may be through an internal bus 1060 in one embodiment. However, other forms of communication are possible.

Internal sensors 1070 or external sensors 1072 may provide data to the computing device 1010. Such sensors may include positioning sensors, lidar, radar, image sensors such as cameras, orientation sensors, temperature sensors, vibration sensors, among other options.

The subject matter of the disclosure herein may also relate, among others, to the embodiments of the following clauses:

AA. A method at a first computing device providing a local traffic service, the method comprising: detecting a vehicle is transitioning to a region of control of a second local traffic service; and providing, to a second traffic management service, priority information for the vehicle.

BB. The method of clause AA, wherein the priority information further includes a vehicle type.

CC. The method of clause AA or clause BB, wherein the priority information further includes a vehicle occupancy level.

DD. The method of any one of clauses AA to CC, wherein the priority information further includes a service level purchased for the vehicle.

EE. The method of any one of clauses AA to DD, wherein the priority information includes routing information for the vehicle.

FF. The method of any one of clauses AA to EE, wherein the providing priority information is performed by sending a message to a master traffic service.

GG. The method of any one of clauses AA to FF, further comprising sending a message to a traffic management service associated with the local traffic service that the vehicle has left the region of control.

HH. The method of any one of clauses AA to GG, wherein the detecting is based on a message from a master traffic service.

II. The method of any one of clauses AA to HH, further comprising receiving information for other vehicles from signaling from the vehicle.

JJ. A first computing device providing a local traffic service, the first computing device comprising: a processor; and a communications subsystem, wherein the first computing device is configured to: detect a vehicle is transitioning to a region of control of a second local traffic service; and provide, to a second traffic management service, priority information for the vehicle.

KK. The first computing device of clause JJ, wherein the priority information further includes a vehicle type.

LL. The first computing device of clause JJ or clause KK, wherein the priority information further includes a vehicle occupancy level.

MM. The first computing device of any one of clauses JJ to LL, wherein the priority information further includes a service level purchased for the vehicle.

NN. The first computing device of any one of clauses JJ to MM, wherein the priority information includes routing information for the vehicle.

OO. The first computing device of any one of clauses JJ to NN, wherein the first computing device is configured to provide priority information by sending a message to a master traffic service.

PP. The first computing device of any one of clauses JJ to OO, further configured to send a message to a traffic management service associated with the local traffic service that the vehicle has left the region of control.

QQ. The first computing device of any one of clauses JJ to PP, wherein the first computing device is configured to detect based on a message from a master traffic service.

RR. The first computing device of any one of clauses JJ to QQ, wherein the first computing device is further configured receive information for other vehicles from signaling from the vehicle.

SS. A computer readable medium for storing instruction code, which, when executed by a processor of a first computing device providing a local traffic service, cause the first computing device to: detect a vehicle is transitioning to a region of control of a second local traffic service; and provide, to a second traffic management service, priority information for the vehicle.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a first computing device providing a local traffic service, the local traffic service controlling traffic prioritization in a local region, the method comprising:
- receiving registration information for a vehicle, the registration comprising a vehicle identifier for the vehicle;
- associating a priority level to the vehicle based on the registration information;
- receiving a request from the vehicle for a different priority level;
- assigning a new priority level to the vehicle based on the request;
- managing the vehicle within the local region, the managing comprising sending commands to the vehicle based on the new priority level associated to the vehicle;
- detecting that the vehicle is transitioning to a region of control of a second local traffic service, the detecting comprising:
  - determining a trajectory of the vehicle;
  - determining a last Road Side Unit (RSU) of the local region, the last RSU of the local region being one of a plurality of RSUs within the local region, which is the last RSU to be encountered by the vehicle as it leaves the local region; and
  - determining that the vehicle is in range of the last RSU; and
- providing, to a master traffic service, priority information for the vehicle, the priority information comprising the new priority level, and an indication that the vehicle is leaving a region of control of the local traffic service;
- wherein the master traffic service is a service which coordinates management of vehicles between local traffic services.

2. The method of claim 1, wherein the priority information further includes a vehicle type.

3. The method of claim 1, wherein the priority information further includes a vehicle occupancy level.

4. The method of claim 1, wherein the priority information further includes a service level purchased for the vehicle.

5. The method of claim 1, wherein the priority information includes routing information for the vehicle.

6. The method of claim 1, further comprising sending a message to a traffic management service associated with the local traffic service that the vehicle has left the region of control.

7. The method of claim 1, wherein the detecting is based on a message from the master traffic service.

8. The method of claim 1, further comprising receiving information for other vehicles from signals from the vehicle.

9. A first computing device providing a local traffic service, the local traffic service controlling traffic prioritization in a local region, the first computing device comprising:

a processor; and a communications subsystem, wherein the first computing device is configured to:

receive registration information for a vehicle, the registration comprising a vehicle identifier for the vehicle;

associate a priority level to the vehicle based on the registration information;

receive a request from the vehicle for a different priority level;

assign a new priority level to the vehicle based on the request;

manage the vehicle within the local region, the managing comprising sending commands to the vehicle based on the new priority level associated to the vehicle;

detect that the vehicle is transitioning to a region of control of a second local traffic service, the detecting comprising:

determining a trajectory of the vehicle;

determining a last Road Side Unit (RSU) of the local region, the last RSU of the local region being one of a plurality of RSUs within the local region, which is the last RSU to be encountered by the vehicle as it leaves the local region; and determining that the vehicle is in range of the last RSU; and provide, to master traffic service, priority information for the vehicle, the priority information comprising the new priority level, and an indication that the vehicle is leaving a region of control of the local traffic service;

wherein the master traffic service is a service which coordinates management of vehicles between local traffic services.

10. The first computing device of claim 9, wherein the priority information further includes a vehicle type.

11. The first computing device of claim 9, wherein the priority information further includes a vehicle occupancy level.

12. The first computing device of claim 9, wherein the priority information further includes a service level purchased for the vehicle.

13. The first computing device of claim 9, wherein the priority information includes routing information for the vehicle.

14. The first computing device of claim 9, further configured to send a message to a traffic management service associated with the local traffic service that the vehicle has left the region of control.

15. The first computing device of claim 9, wherein the first computing device is configured to detect based on a message from the master traffic service.

16. The first computing device of claim 9, wherein the first computing device is further configured to receive information for other vehicles from signals from the vehicle.

17. A non-transitory computer readable medium for storing instruction code, which, when executed by a processor of a first computing device providing a local traffic service, the local traffic service controlling traffic prioritization in a local region, cause the first computing device to:

receive registration information for a vehicle, the registration comprising a vehicle identifier for the vehicle;

associate a priority level to the vehicle based on the registration information;

receive a request from the vehicle for a different priority level;

assign a new priority level to the vehicle based on the request;

manage the vehicle within the local region, the managing comprising sending commands to the vehicle based on the new priority level associated to the vehicle;

detect that the vehicle is transitioning to a region of control of a second local traffic service, the detecting comprising:

determining a trajectory of the vehicle;

determining a last Road Side Unit (RSU) of the local region, the last RSU of the local region being one of a plurality of RSUs within the local region, which is the last RSU to be encountered by the vehicle as it leaves the local region; and determining that the vehicle is in range of the last RSU; and provide, to a master traffic service, priority information for the vehicle, the priority information comprising the new priority level, and an indication that the vehicle is leaving a region of control of the local traffic service;

wherein the master traffic service is a service which coordinates management of vehicles between local traffic services.

* * * * *